(12) United States Patent
Hatakeyama (10) Patent No.: US 7,047,444 B2
(45) Date of Patent: May 16, 2006

(54) ADDRESS SELECTION FOR TESTING OF A MICROPROCESSOR

(75) Inventor: Tsutomu Hatakeyama, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 673 days.

(21) Appl. No.: 10/327,113

(22) Filed: Dec. 24, 2002

(65) Prior Publication Data
US 2003/0120973 A1 Jun. 26, 2003

(30) Foreign Application Priority Data
Dec. 26, 2001 (JP) ............... 2001-394128

(51) Int. Cl.
*G06F 11/00* (2006.01)
(52) U.S. Cl. ............ 714/36; 713/1; 713/2; 714/30
(58) Field of Classification Search ............ 714/36, 714/30
See application file for complete search history.

(56) References Cited

U.S. PATENT DOCUMENTS

| 4,484,261 | A | * | 11/1984 | Brantingham | 711/219 |
| 5,548,713 | A |   | 8/1996  | Petry et al. | |
| 5,566,303 | A | * | 10/1996 | Tashiro et al. | 710/100 |
| 5,764,593 | A |   | 6/1998  | Turpin et al. | |
| 5,949,997 | A | * | 9/1999  | Smith | 713/2 |
| 6,311,298 | B1 | * | 10/2001 | Norrie | 714/718 |
| 6,363,492 | B1 |   | 3/2002  | James, Jr. et al. | |
| 6,421,792 | B1 | * | 7/2002  | Cromer et al. | 714/36 |
| 2004/0098578 | A1 | * | 5/2004 | Funayama | 713/2 |

FOREIGN PATENT DOCUMENTS

| JP | 63-282853 | 11/1988 |
| JP | 1-127036  | 8/1989  |
| JP | 4-170647  | 6/1992  |

* cited by examiner

*Primary Examiner*—Scott Baderman
*Assistant Examiner*—Paul L. Contino
(74) *Attorney, Agent, or Firm*—Oblon, Spivak, McClelland, Maier & Neustadt, P.C.

(57) ABSTRACT

A microprocessor with built-in test, comprising: a register for retaining a test address of a test program; a next address generation logic for generating a command address of a command scheduled to be executed next, based on a command address of a command to be executed next; a first multiplexer for selecting, based on a test mode signal, any one of a boot address specifying a bootstrap program and the test address; a second multiplexer for selecting, based on a reset signal, any one of the command address of the command scheduled to be executed next and the address selected by the first multiplexer; and a program counter for retaining the address selected by the second multiplexer and for outputting the retained address to the next address generation logic as the command address of the command to be executed next.

14 Claims, 7 Drawing Sheets

ADDRESS SELECTION FOR TESTING OF A MICROPROCESSOR

CROSS REFERENCE TO RELATED APPLICATIONS

This application is based upon and claims the benefit of priority from the prior Japanese Patent Application P2001-394128 filed on Dec. 26, 2001; the entire contents of which are incorporated herein by reference.

BACKGROUND OF THE INVENTION

1. Field of the Invention

The present invention relates to a microprocessor for verifying internal functions in an actual machine in accordance with a test program executed after a reset of the microprocessor, and to a processing method of the microprocessor.

2. Description of the Related Art

In a conventional microprocessor, a bootstrap is executed after the microprocessor is reset. This bootstrap is executed in a manner that a boot address previously prepared in each microprocessor is set in a program counter, and based on this boot address, the bootstrap program is loaded into the microprocessor from a memory such as, for example, a boot ROM. Therefore, the bootstrap program executed after the reset of the microprocessor depended on the boot address fixedly set for each microprocessor. Moreover, attributes of the memory accessed based on the boot address were also fixed.

According to a development evaluation of such a conventional microprocessor as described above, in some cases, although the bootstrap as described above is executed after the reset of the microprocessor, a normal operational state is not reached due to trouble generated in functions of the microprocessor. In such a case, the conventional microprocessor did not have a mechanism for setting another address in the program counter in place of the boot address after the reset, thus making it impossible to verify the functions of the microprocessor. Specifically, it was impossible to independently verify the various independent functions of the microprocessor by setting a test address to access a test program in the program counter in place of the boot address, the test program being prepared for the purpose of verifying the functions of the microprocessor in an actual machine after the reset thereof, and by accessing the test program to be executed based on the set test address.

As described above, the conventional microprocessor was unable to set an address other than the boot address in the program counter after the reset thereof, thus making it impossible to execute a program other than the bootstrap after the reset thereof. Therefore, if trouble was generated in the microprocessor, it was impossible to verify the functions of the microprocessor by executing the test program after the reset of the microprocessor.

SUMMARY OF THE INVENTION

A first aspect of the present invention is to provide a microprocessor with built-in test, comprising: a) a register for retaining a test address of a test program; b) a next address generation logic for generating a command address of a command scheduled to be executed next, based on a command address of a command to be executed next; c) a first multiplexer for selecting, based on a test mode signal, any one of a boot address specifying a bootstrap program and the test address; d) a second multiplexer for selecting, based on a reset signal, any one of the command address of the command scheduled to be executed next and the address selected by the first multiplexer; and e) a program counter for retaining the address selected by the second multiplexer and for outputting the retained address to the next address generation logic as the command address of the command to be executed next.

A second aspect of the present invention is to provide a microprocessor with built-in test, comprising: a) a cache memory for storing a command to be executed in a normal operation of the microprocessor and storing a test program in a test operation mode thereof; b) a next address generation logic for generating a command address of a command scheduled to be executed next, based on a command address of a command to be executed next; c) a first multiplexer for selecting, based on a test mode signal, any one of a boot address specifying a bootstrap program and a test address to be a head address of the cache memory; d) a second multiplexer for selecting, based on a reset signal, any one of the command address of the command scheduled to be executed next and the address selected by the first multiplexer; and e) a program counter for retaining the address selected by the second multiplexer and for outputting the retained address to the next address generation logic as the command address of the command to be executed next.

A third aspect of the present invention is to provide a processing method of a microprocessor with built-in test, comprising: a) generating a command address of a command scheduled to be executed next, based on a command address of a command to be executed next; b) selecting any one of a boot address specifying a bootstrap program and a test address of a test program, based on a test mode signal; c) selecting any one of the command address of the command scheduled to be executed next and the selected address, based on a reset signal; and d) outputting the address selected based on the reset signal as the command address of the command to be executed next.

A fourth aspect of the present invention is to provide a processing method of a microprocessor with built-in test, comprising: a) storing a command to be executed in a normal operation in a cache memory and storing a test program in a test operation mode in the cache memory; b) generating a command address of a command scheduled to be executed next, based on a command address of a command to be executed next; c) selecting any one of a boot address specifying a bootstrap program and a test address to be a head address of the cash memory, based on a test mode signal; d) selecting any one of the command address of the command scheduled to be executed next and the address selected based on the test mode signal, based on a reset signal; and e) outputting the address selected based on the reset signal as the command address of the command to be executed next.

DETAILED DESCRIPTION OF THE INVENTION

Various embodiments of the present invention are described while referencing the drawings. The same or similar reference numerals are used for the same or similar portions in the following description of the drawings. However, the drawings are schematic and it should be noted that the scale of each measurement may be different from those in actuality.

FIRST EMBODIMENT

Figure 1:
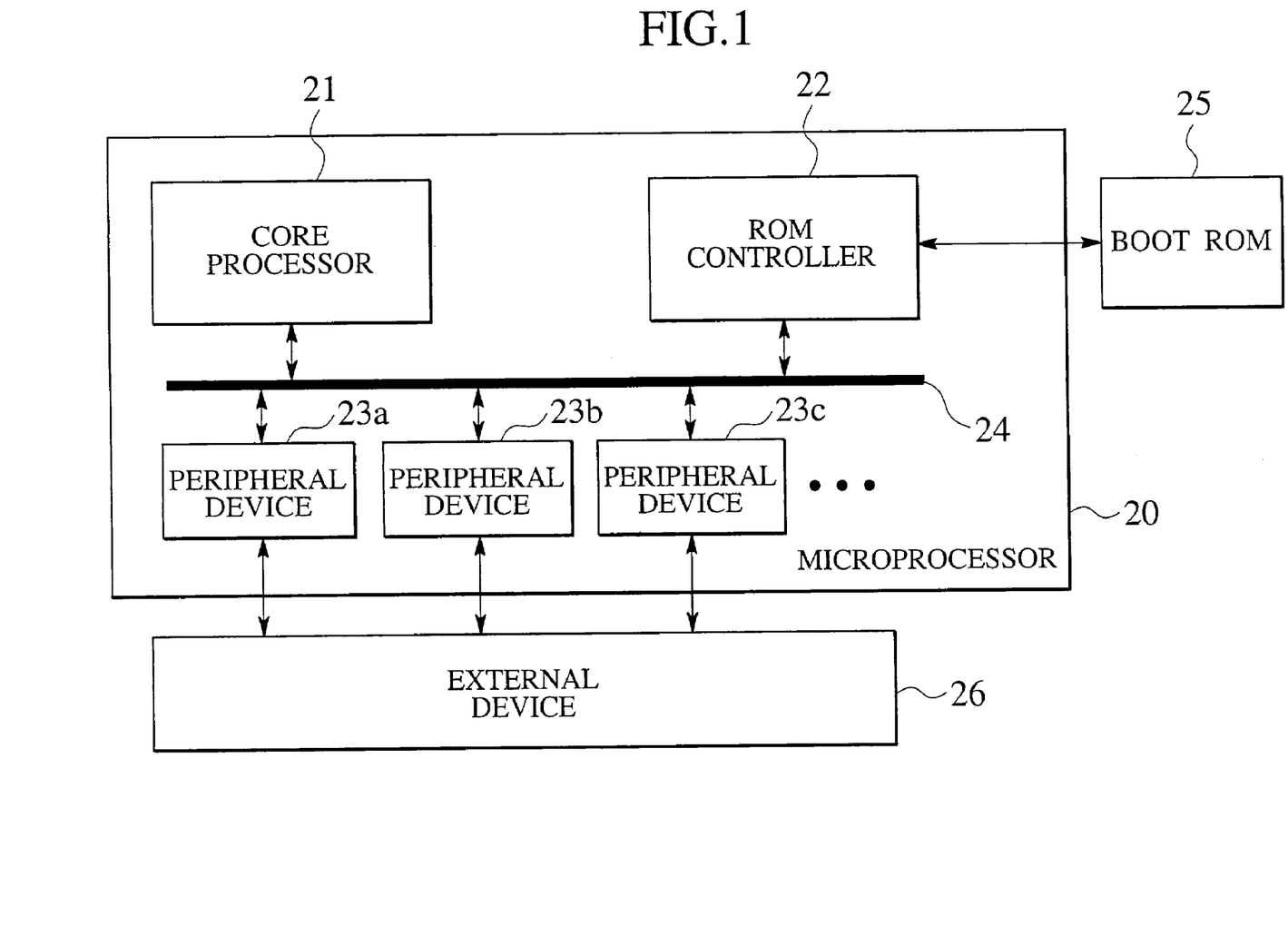
FIG. 1 is a view showing a configuration of a microprocessor according to a first embodiment of the present invention.

As shown in FIG. 1, a microprocessor 20 according to a first embodiment of the present invention includes: a core processor 21 to be a control center of the microprocessor 20; a ROM controller 22 for controlling a memory access between the microprocessor 20 and a boot ROM 25; a plurality of peripheral devices 23a, 23b, 23c . . . having various functions; and a system bus 24 for connecting the core processor 21, the ROM controller 22 and the peripheral devices 23a, 23b, 23c . . . . Furthermore, outside of the microprocessor 20, provided are: the boot ROM 25 connected to the ROM controller 22; and an external device 26 connected to the peripheral devices 23a, 23b, 23c . . . . In such a configuration, when the microprocessor 20 is reset in a normal operation mode, the boot ROM 25 is accessed under the control of the ROM controller 22. Then, a program 31 of a bootstrap stored in the boot ROM 25 is read into the core processor 21, thus performing the bootstrap.

Figure 2:
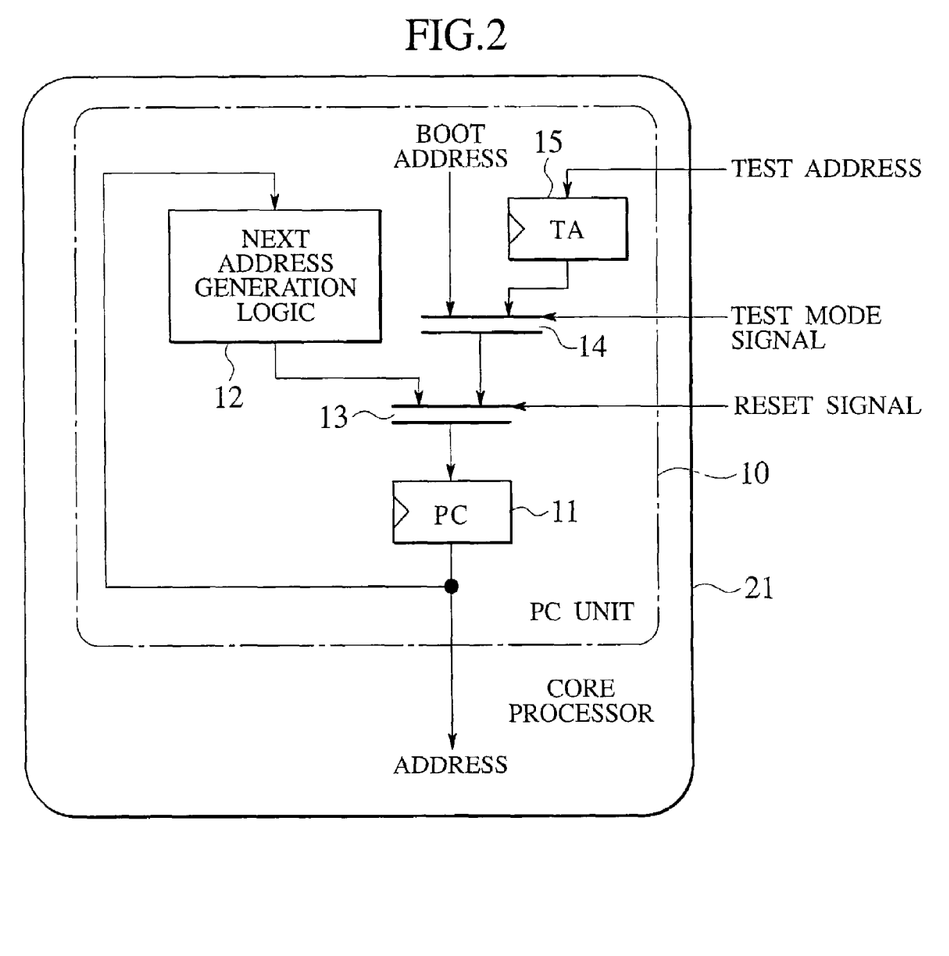
FIG. 2 is a view showing a configuration of a PC unit inside a core processor shown in FIG. 1.

FIG. 2 is a view showing a configuration of a PC unit 10 inside the core processor 21 shown in FIG. 1. The PC unit 10 performs the generation control of a command address in the core processor 21, and as shown in FIG. 2, includes a program counter (PC) 11, a next address generation logic 12, a reset control multiplexer 13, a reset mode multiplexer 14 and a test mode address retention register (TA) 15.

The program counter 11 retains a command address of a command to be executed next. The retained command address is passed to the next address generation logic 12 together with a configuration for accessing the command to be executed next. Based on the command address of the command to be executed next, which is passed from the program counter 11, the next address generation logic 12 generates a command address of a command scheduled to be executed next. The generated command address is passed to the reset control multiplexer 13. The reset control multiplexer 13 receives the command address passed from the next address generation logic 12, or an address selected in the reset mode multiplexer 14, and selects any one of these addresses based on a reset signal of the microprocessor 20, which is passed from outside. The selected address is passed to the program counter 11. The reset mode multiplexer 14 receives a boot address for starting a bootstrap during reset of the microprocessor 20 in the normal operation mode or a test address retained in the test mode address retention register 15, and selects any one of these addresses based on a test mode signal passed from the outside. The selected address is passed to the reset control multiplexer 13. The test mode address retention register 15 in advance sets a test address of a test program passed from the outside before the reset of the microprocessor in a test operation mode and retains the test address thus set.

Figure 3:
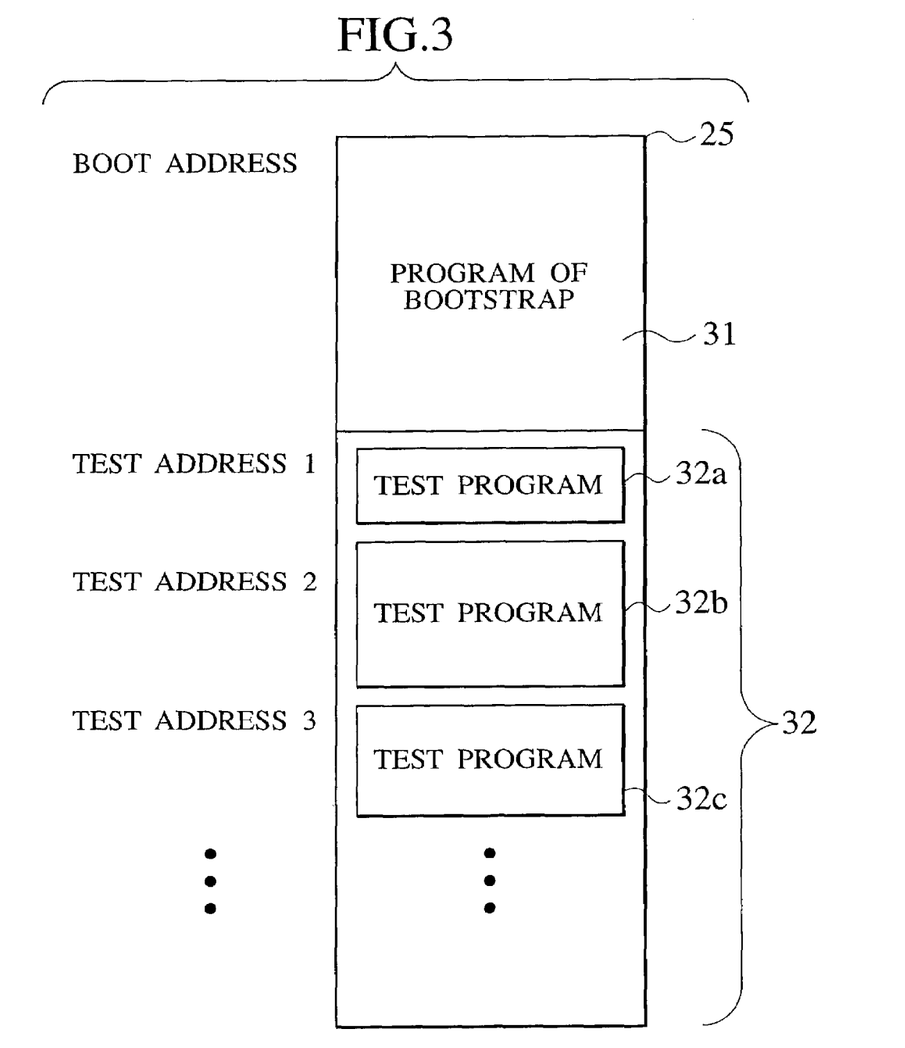
FIG. 3 is a view showing an address space of a boot ROM according to the first embodiment of the present invention.

As shown in FIG. 3, the boot ROM 25 stores the program 31 of the bootstrap and a test program 32. The test program 32 is stored in remaining available space in the boot ROM 25, in which the program 31 of the bootstrap is stored, as shown in FIG. 3. A boot address to be a head address of the program 31 of the bootstrap is set as a fixed value in an address space of the boot ROM 25. This boot address is passed to the reset mode multiplexer 14. The test program 32 is composed of the plurality of test programs 32a, 32b, 32c . . . . As the respective test programs 32a, 32b, 32c . . . , various test programs are assumed, including, for example: a test program for testing addition processing in a function of a computing unit; a test program for testing entire functions of the computing unit; a test program for testing a part of or all of the peripheral devices 23a, 23b, 23c . . . including memory, and of function blocks; and the like. When executing the respective programs 32a, 32b, 32c, the respective head addresses test address 1, test address 2, test address 3 . . . corresponding thereto in the address space of the boot ROM 25 are passed to the test mode address retention register 15 from the outside and retained therein. The boot ROM 25 retaining the program 31 of the bootstrap and the test program 32 may be replaced by another boot ROM appropriately in accordance with contents of the test program 32. Moreover, when executing the test only, the boot ROM 25 may be replaced by a memory storing the test program 32 only.

Figure 4:
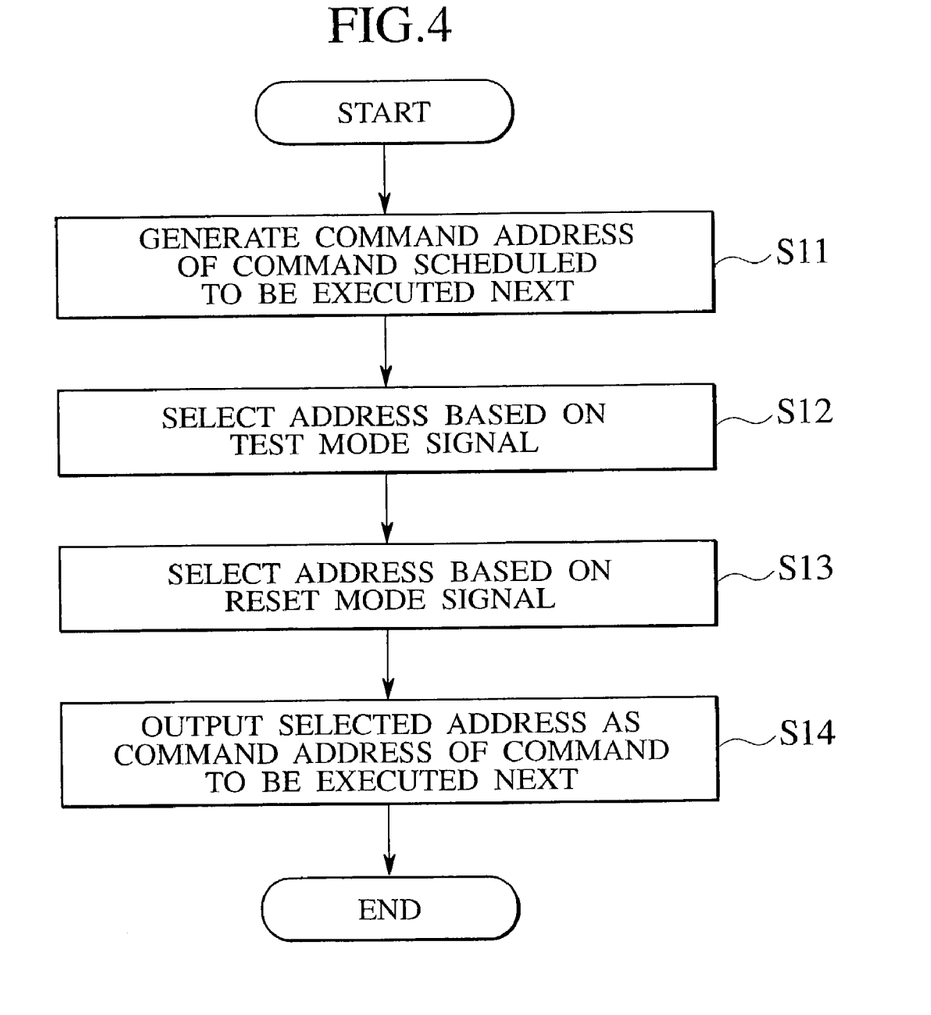
FIG. 4 is a flowchart illustrating a processing method of the microprocessor according to the first embodiment of the present invention.

Next, FIG. 4 is a flowchart illustrating a processing method of the microprocessor 20 according to the first embodiment of the present invention.

(a) First, in Step S11, a command is fetched and executed, based on a command address of a command to be executed next, the command address being retained in the program counter 11, and the command address of the command to be executed next is further passed to the next address generation logic 12. The next generation logic 12 generates a command address of a command scheduled to be executed next based on the command address of the command to be executed next which is passed from the program counter 11.

(b) Next, in Step S12, based on a test mode signal, the reset mode multiplexer 14 selects any one of the following addresses: a boot address for specifying a bootstrap program; and a test address of a test program. Specifically, the boot address is selected after a reset of the microprocessor in a normal operation mode during a non assert state of the test mode signal; meanwhile, the test address is selected after a reset thereof in a test operation mode during an assert state of the test mode signal.

(c) Next, in Step S13, based on a reset signal, the reset control multiplexer 13 selects any one of the following addresses: the command address of the command scheduled to be executed next, the command address being generated by the next address generation logic 12 in Step S11; and the address selected by the reset mode multiplexer 14. Specifically, the reset control multiplexer 13 selects the address selected based on the test mode signal after a reset of the microprocessor in the normal operation mode or in the test operation mode; meanwhile, the reset control multiplexer 13 selects the command address of the command scheduled to be executed next in the normal operation after a reset thereof is released.

(d) Then, in Step S14, the program counter 11 retains the address selected by the reset control multiplexer 13 and outputs the address to the next address generation logic 12 as the command address of the command to be executed next. Here, in the case that the boot address is retained in the program counter 11, the program 31 of the bootstrap stored in the boot ROM 25 is read into the core processor 21 based on the retained boot address, and the bootstrap is executed. Meanwhile, when the test address is retained in the program counter 11, the test program 32 stored in the boot ROM 25 is read into the core processor 21 based on the retained test address, and the test program is executed.

Next, description will be made respectively for a reset operation in the normal operation mode of the microprocessor 20 according to the first embodiment of the present invention, for a normal operation after the reset thereof is released and for a reset operation in the test operation mode thereof.

In the reset operation in the normal operation mode when the test mode signal is in the non assert state, the reset signal is asserted and then passed to the microprocessor 20. When the microprocessor 20 is reset, the boot address is selected by the reset mode multiplexer 14. The selected boot address is then further selected by the reset control multiplexer 13, and the selected boot address is passed to the program counter 11 and retained therein. Then, based on the boot address retained in the program counter 11, the program 31 of the bootstrap stored in the boot ROM 25 is read into the core processor 21 to be executed, thus performing the bootstrap.

In the normal operation after the reset signal is asserted and the reset of the microprocessor is released, the command address generated in the next address generation logic 12 is selected by the reset control multiplexer 13. The selected command address is passed to the program counter 11 and retained therein. Then, based on the command address retained in the program counter 11, the command is fetched and executed. Thereafter, the command address of the command to be executed still next is generated in the next address generation logic 12, and the command address is passed to the program counter 11 and retained therein. The operations as described above are repeated, and thus a series of commands are executed.

In the reset operation of the test operation mode, when the test mode signal is in the assert state, first, before the reset operation is performed, the test address, which will be the head address of the test program to be executed after the reset, is passed in advance to the test mode address retention register 15 from the outside and retained therein. In such a state, when the test mode signal is asserted and passed to the reset mode multiplexer 14, the test address retained in the test mode retention register 15 is selected by the reset mode multiplexer 14. The selected test address is passed to the reset control multiplexer 13. Thereafter, when the reset signal is asserted and passed to the reset control multiplexer 13, the test address is selected by the reset control multiplexer 13. The selected test address is passed to the program counter 11 and retained therein. Then, based on the test address retained in the program counter 11, the test program 32 stored in the boot ROM 25 is read into the core processor 21, and executed. Therefore, in accordance with the contents of the executed test program 32, the functions of the microprocessor are tested.

In the microprocessor according to the first embodiment of the present invention, it is made possible to independently verify the individual and independent functions of the microprocessor by the programs in an actual machine after the reset of the microprocessor.

SECOND EMBODIMENT

Figure 5:
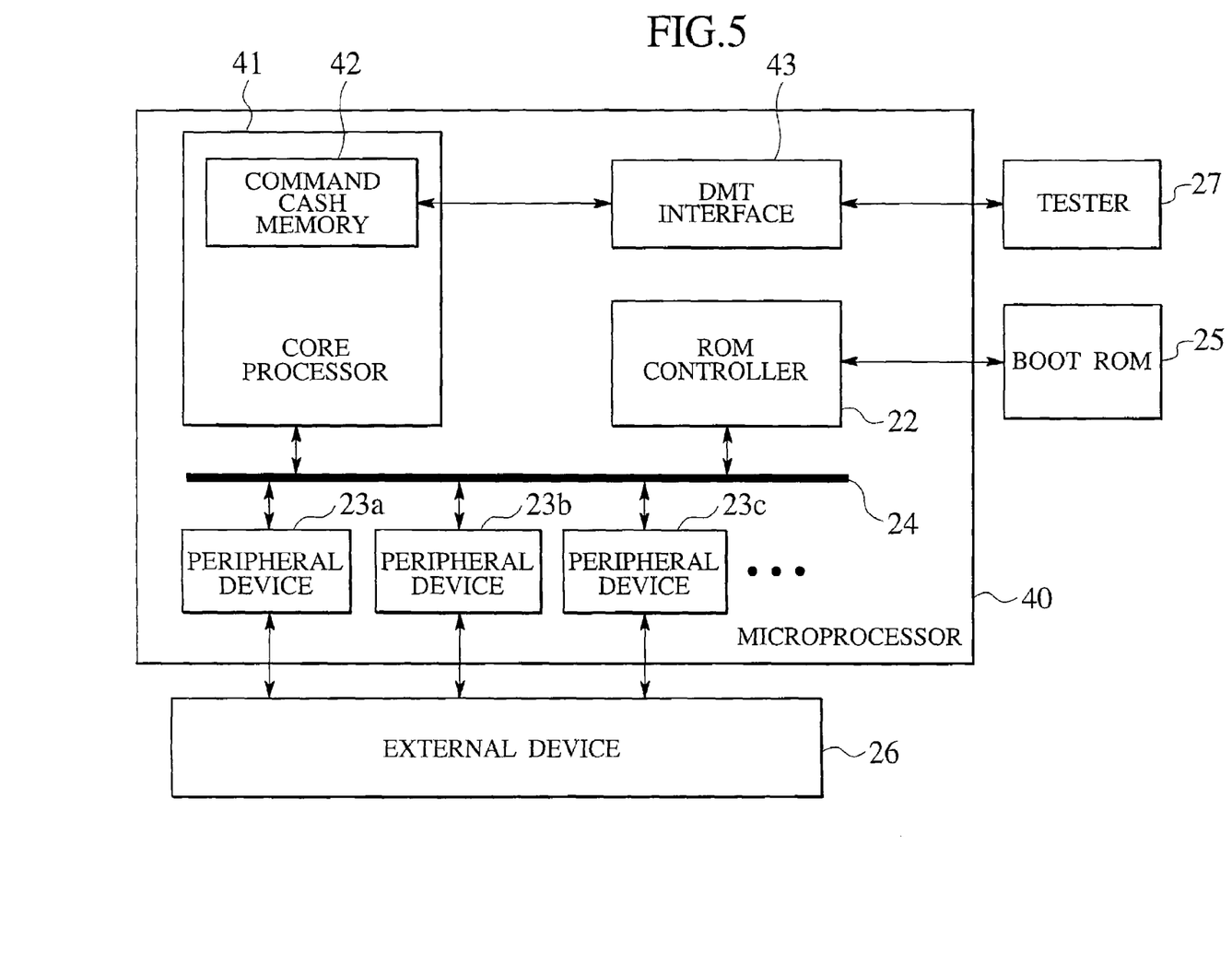
FIG. 5 is a view showing a configuration of a microprocessor according to a second embodiment of the present invention.

A microprocessor 40 according to a second embodiment of the present invention is, as shown in FIG. 5, different from the microprocessor 20 according to the first embodiment in that a core processor 41 includes a command cache memory 42. The command cash memory 42 stores a command to be executed in the normal operation and stores the test program 32 to be executed in the test operation mode. To the command cache memory 42, a DMT interface 43 is connected, which is capable of performing a direct memory test (DMT) for directly testing the command cache memory 42 in the test operation mode. Microprocessor 40 has a configuration in which a tester 27 provided outside the microprocessor 40 is connected to the DMT interface 43, and in which the command cache memory 42 can be accessed via the DMT interface 43 from the tester 27.

Figure 6:
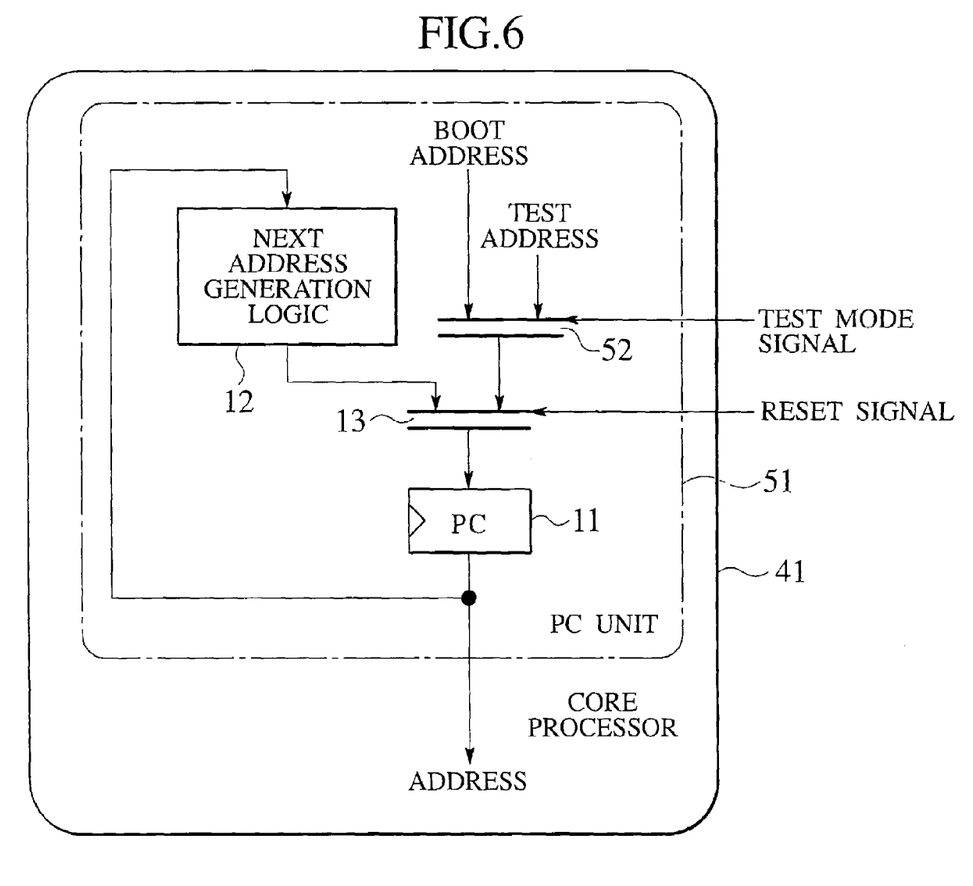
FIG. 6 is a view showing a configuration of a PC unit inside a core processor shown in FIG. 5.

FIG. 6 is a view showing a configuration of a PC unit 51 inside the core processor 41 shown in FIG. 5. In FIG. 6, compared with the PC unit 10 shown in FIG. 2, the PC unit 51 is configured such that, instead of using the test mode address retention register 15 shown in FIG. 2, a test address is passed as a fixed value to a reset mode multiplexer 52, a boot address or the test address, which is passed as the fixed value, is selected by the reset mode multiplexer 52, and the selected address is passed to the reset control multiplexer 13. Other than the above, the configurations of the PC unit 51 are similar to those of the PC unit 10 shown in FIG. 2.

Note that, in the microprocessor 40 according to the second embodiment of the present invention, as shown in FIG. 6, the test address is passed to the reset mode multiplexer 52 as the fixed value. However, as shown in FIG. 2, the test mode address retention register 15 for retaining the test address may be provided instead.

Figure 7:
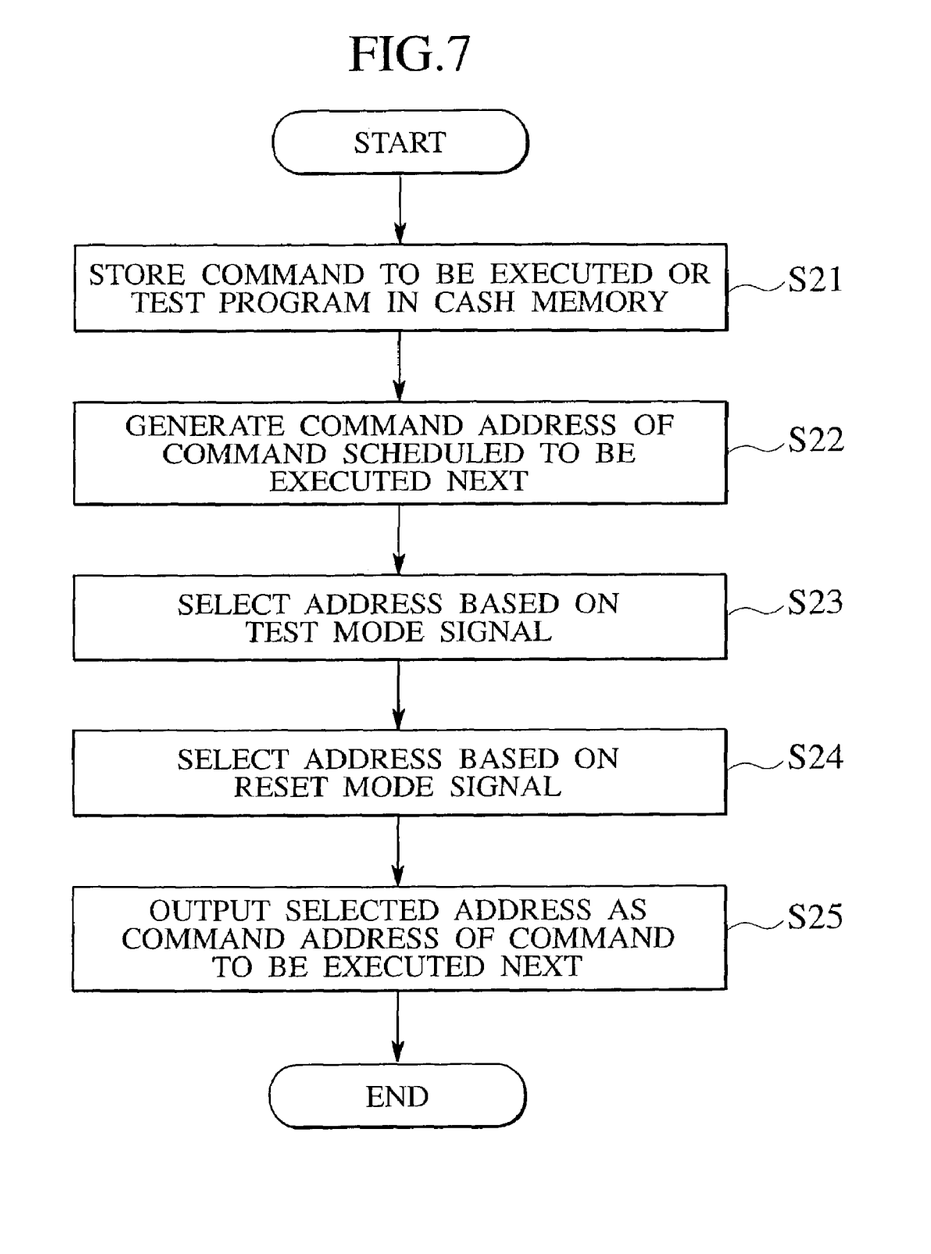
FIG. 7 is a flowchart illustrating a processing method of the microprocessor according to the second embodiment of the present invention.

Next, FIG. 7 is a flowchart illustrating a processing method of the microprocessor 40 according to the second embodiment of the present invention.

(a) First, in Step S21, the test program 32 to be executed in the test operation mode is written into a predetermined address space of the command cache memory 42 in the core processor 41 from the tester 27 provided outside via the DMT interface 43, and then the command cache memory 42 is validated. Note that, in the test operation mode, the DMT interface 43 performs the direct memory test of the command cach memory 42.

(b) Next, in Step S22, a command based on a command address of a command to be executed next, the command address being retained in the program counter 11, is fetched and executed. Then, the command address of the command to be executed next is passed to the next address generation logic 12. The next address generation logic 12 generates a command address of a command scheduled to be executed next, based on the command address of the command to be executed next, which is passed from the program counter 11.

(c) Next, in Step S23, based on a test mode signal, the reset mode multiplexer 52 selects any one of the following addresses: a boot address for specifying a bootstrap program; and a test address to be a head address of the command cache memory 42. Specifically, the boot address is selected after a reset of the microprocessor in the normal operation mode during the non assert state of the test mode signal; meanwhile, the test address is selected after a reset thereof in the test operation mode during the assert state of the test mode signal.

(d) Next, in Step S24, based on a reset signal, the reset control multiplexer 13 selects any one of the following addresses: the command address of the command scheduled to be executed next, the command address being generated by the next address generation logic 12 in Step S11; and the address selected by the reset mode multiplexer 52. Specifically, the reset control multiplexer 13 selects the address selected based on the test mode signal after a reset of the microprocessor in the normal operation mode or in the test operation mode; meanwhile, the reset control multiplexer 13 selects the command address of the command scheduled to be executed next in the normal operation after a reset thereof is released.

(e) Subsequently, in Step S25, the program counter 11 retains the address selected by the reset control multiplexer 13 and outputs the address to the next address generation logic 12 as the command address of the command to be executed next. Here, in the case that the boot address is retained in the program counter 11, the program 31 of the bootstrap stored in the boot ROM 25 is read into the core processor 21 based on the retained boot address, and the bootstrap is executed. Meanwhile, in the case that the test address is retained in the program counter 11, the test program 32 written into the command cache memory 42 in Step S21 is read into the core processor 21 based on the retained test address, and the test program is executed.

Next, description will be made for a reset operation in the test operation mode of the microprocessor 40 according to the second embodiment of the present invention. Note that a reset operation in the normal operation mode of the microprocessor 40 according to the second embodiment of the present invention and a normal operation thereof after the reset thereof is released are similar to those of the above-described microprocessor 20 according to the first embodiment of the present invention, and thus description thereof will be omitted.

In the reset operation in the test operation mode of the microprocessor when the test mode signal is in the assert state, first, the test program 32 to be executed is written into the predetermined address space of the command cache memory 42 in the core processor 41 from the tester 27 provided outside via the DMT interface 43, and then the command cache memory 42 is validated. Subsequently, when the test mode signal is asserted and passed to the reset mode multiplexer 52, the test address is selected by the reset mode multiplexer 52. Thereafter, when the reset signal is asserted and passed to the reset control multiplexer 13, the test address is selected by the reset control multiplexer 13. The selected test address is passed to the program counter 11 and retained therein. The test address is set as the head address, in which the test program 32 is written, into the command cache memory 42. Thus, based on the test address retained in the program counter 11, the test program 32 written into the command cache memory 42 is read from the command cash memory 42 and executed.

In the microprocessor according to the second embodiment of the present invention, it is made possible to read the test program 32 into the core processor 41 and execute the test program without accessing the boot ROM 25 via the ROM controller 22 or going through the system bus 24. Therefore, even when there are troubles in the boot ROM 25 and the ROM controller 22, it is made possible to verify the functions of the microprocessor in an actual machine. Moreover, independence of the core processor in the function verification in the actual machine is significantly increased, thus enabling a built-in-test (BIT) with higher independence.

OTHER EMBODIMENTS

Various modifications will become possible for those skilled in the art after receiving the teachings of the present disclosure without departing from the scope thereof.

The apparatus of the present invention may be implemented with various corrections and modifications without falling outside of the spirit and scope of the present invention as laid out by the patent claims. Accordingly, the description included in this application is intended to be an exemplary description, and is not meant to be construed as limiting the present invention in any manner.

What is claimed is:

1. A microprocessor with built-in test, comprising:
   a register for retaining a test address of a test program;
   a next address generation logic for generating a command address of a command scheduled to be executed next, based on a command address of a command to be executed next;
   a first multiplexer for selecting, based on a test mode signal, any one of a boot address specifying a bootstrap program and the test address;
   a second multiplexer for selecting, based on a reset signal, any one of the command address of the command scheduled to be executed next and the address selected by the first multiplexer; and
   a program counter for retaining the address selected by the second multiplexer and for outputting the retained address to the next address generation logic as the command address of the command to be executed next.

2. The microprocessor of claim 1, wherein the first multiplexer selects the boot address after a reset of the microprocessor in a normal operation mode and selects the test address after a reset thereof in a test operation mode.

3. The microprocessor of claim 1, wherein the second multiplexer selects the address selected by the first multiplexer after a reset of the microprocessor in a normal operation mode or in a test operation mode and selects the command address of the command scheduled to be executed next in the normal operation of the microprocessor after a reset thereof is released.

4. A microprocessor with built-in test, comprising:
   a cache memory for storing a command to be executed in a normal operation of the microprocessor and storing a test program in a test operation mode thereof;
   a next address generation logic for generating a command address of a command scheduled to be executed next, based on a command address of a command to be executed next;
   a first multiplexer for selecting, based on a test mode signal, any one of a boot address specifying a bootstrap program and a test address to be a head address of the cache memory;
   a second multiplexer for selecting, based on a reset signal, any one of the command address of the command scheduled to be executed next and the address selected by the first multiplexer; and
   a program counter for retaining the address selected by the second multiplexer and for outputting the retained address to the next address generation logic as the command address of the command to be executed next.

5. The microprocessor of claim 4, further comprising:
   an interface for performing a direct memory test of the cache memory in the test operation mode.

6. The microprocessor of claim 4, wherein the first multiplexer selects the boot address after a reset of the microprocessor in a normal operation mode and selects the test address after a reset thereof in a test operation mode.

7. The microprocessor of claim 4, wherein the second multiplexer selects the address selected by the first multiplexer after a reset of the microprocessor in a normal operation mode or in a test operation mode and selects the command address of the command scheduled to be executed next in the normal operation of the microprocessor after a reset thereof is released.

8. A processing method of a microprocessor with built-in test, comprising:
   generating a command address of a command scheduled to be executed next, based on a command address of a command to be executed next;
   selecting any one of a boot address specifying a bootstrap program and a test address of a test program, based on a test mode signal;
   selecting any one of the command address of the command scheduled to be executed next and the selected address, based on a reset signal; and
   outputting the address selected based on the reset signal as the command address of the command to be executed next.

9. The method of claim 8, wherein, in the address selection based on the test mode signal, the boot address is selected after a reset of the microprocessor in a normal operation mode and the test address is selected after a reset thereof in a test operation mode.

10. The method of claim 8, wherein, in the address selection based on the reset signal, the address selected based on the test mode signal is selected after a reset of the microprocessor in a normal operation mode or in a test operation mode and the command address of the command scheduled to be executed next is selected in the normal operation of the microprocessor after a reset thereof is released.

11. A processing method of a microprocessor with built-in test, comprising:
   storing a command to be executed in a normal operation in a cache memory and storing a test program in a test operation mode in the cache memory;
   generating a command address of a command scheduled to be executed next, based on a command address of a command to be executed next;
   selecting any one of a boot address specifying a bootstrap program and a test address to be a head address of the cache memory, based on a test mode signal;
   selecting any one of the command address of the command scheduled to be executed next and the address selected based on the test mode signal, based on a reset signal; and
   outputting the address selected based on the reset signal as the command address of the command to be executed next.

12. The method of claim 11, further comprising:
   performing a direct memory test of the cache memory in the test operation mode.

13. The method of claim 11, wherein in the address selection based on the test mode signal, the boot address is selected after a reset of the microprocessor in a normal operation mode and the test address is selected after a reset thereof in a test operation mode.

14. The method of claim 11, wherein, in the address selection based on the reset signal, the address selected based on the test mode signal is selected after a reset of the microprocessor in a normal operation mode or in a test operation mode and the command address of the command scheduled to be executed next is selected in the normal operation mode of the microprocessor after a reset thereof is released.

* * * * *